(12) United States Patent
Kenyon et al.

(10) Patent No.: US 8,636,394 B2
(45) Date of Patent: Jan. 28, 2014

(54) LIGHT EMITTING DIODE PERIMETER LAMP ASSEMBLY

(75) Inventors: Nicholas Kenyon, Sherman, NY (US); Tim Dunn, Falconer, NY (US); Tim DiPenti, Russell, PA (US)

(73) Assignee: Truck-Lite Co., LLC, Falconer, NY (US)

( * ) Notice: Subject to any disclaimer, the term of this patent is extended or adjusted under 35 U.S.C. 154(b) by 177 days.

(21) Appl. No.: 13/312,967

(22) Filed: Dec. 6, 2011

(65) Prior Publication Data
US 2013/0141927 A1    Jun. 6, 2013

(51) Int. Cl.
  *B60Q 1/32*    (2006.01)
  *B62D 33/00*    (2006.01)

(52) U.S. Cl.
  USPC .............................. 362/485; 362/545; 362/540

(58) Field of Classification Search
  USPC ........................ 362/485, 540, 545; 296/182.1; 340/932.2, 431
  See application file for complete search history.

(56) References Cited

U.S. PATENT DOCUMENTS

| | | | |
|---|---|---|---|
| 5,209,559 A * | 5/1993 | Ruppel | 362/485 |
| 5,430,625 A * | 7/1995 | Abarr et al. | 362/485 |
| 6,422,728 B1 * | 7/2002 | Riggin | 362/540 |
| 6,840,660 B2 * | 1/2005 | Hymer | 362/545 |
| 7,111,968 B2 | 9/2006 | Bauer et al. | |
| 7,178,941 B2 | 2/2007 | Roberge et al. | |
| 7,237,932 B2 | 7/2007 | Ter-Hovhannissian | |
| 7,245,203 B2 | 7/2007 | Stephens et al. | |
| 7,772,988 B1 | 8/2010 | Condon et al. | |
| 8,459,725 B2 * | 6/2013 | Haire et al. | 296/182.1 |
| 2010/0302779 A1 | 12/2010 | Chemel et al. | |

* cited by examiner

*Primary Examiner* — Peggy A. Neils
(74) *Attorney, Agent, or Firm* — The Bilicki Law Firm, P.C.; Byron A. Bilicki; Rebecca M.K. Tapscott

(57) ABSTRACT

A light emitting diode perimeter lamp assembly generally includes a housing a receiving pocket formed therein for receiving a circuit board with a plurality of light emitting diodes mounted thereon. In addition, a culminating lens having a plurality of light directing elements is positioned within the receiving pocket of the housing above the circuit board such that light emitted from said plurality of light emitting diodes passes through said plurality of light directing elements. An outer lens is also mounted over the receiving pocket. When the perimeter lamp is installed on a truck body, the bottom side of the lamp housing is at an acute angle to a ground surface while the back end of the perimeter lamp is adjacent and parallel to a truck wall such that light emitted by the plurality of light emitting diodes is projected onto the ground surface adjacent to the truck wall.

20 Claims, 16 Drawing Sheets

LIGHT EMITTING DIODE PERIMETER LAMP ASSEMBLY

A light emitting diode perimeter lamp assembly generally includes a housing having a back end adapted to abut a truck wall, a front end, a bottom side with a receiving pocket formed therein and a top side with a plurality of fins formed therein. A circuit board adapted to fit within the receiving pocket of the housing and a plurality of light emitting diodes mounted on the circuit board. In addition, a collimator having a plurality of light directing elements is positioned within the receiving pocket of the housing above the circuit board such that light emitted from said plurality of light emitting diodes passes through said plurality of light directing elements. An outer lens is also mounted over the receiving pocket of the bottom side of the housing. When the perimeter lamp is installed on a truck body, the bottom side of the lamp housing is at an acute angle to a ground surface while the back end of the perimeter lamp is adjacent and parallel to the truck wall such that light emitted by the plurality of light emitting diodes is projected onto the ground surface adjacent to the truck wall.

Although not limited to a specific location on a truck body, the perimeter lamp assembly may be installed in an upper rail of a trailer or box of a delivery vehicle. The perimeter lamp assembly has a thin or low profile such that it fits into an upper rail of a truck or trailer. In addition, the perimeter lamp assembly is narrow such that the perimeter lamp assembly minimally protrudes from the trailer body.

When the lamp is installed in the upper rail it is in an elevated location such that it provides a light pattern that provides illumination along the length of the trailer. The configuration of the lamp assembly also limits the distance that the light travels outward from the side of the trailer or vehicle. Thus, only the immediate foreground of the trailer or body is illuminated. The lamp assembly illuminates an area where there is generally no visibility.

In one embodiment an ambient light sensor is used for automatically for turning the lamp assembly on and off, thereby saving trailer and vehicle battery power. A clear window is provided in the perimeter lamp assembly to allow for ambient light to easily pass into the lamp near the area where the light sensor is located.

DETAILED DESCRIPTION OF THE DRAWINGS

Figure 1:
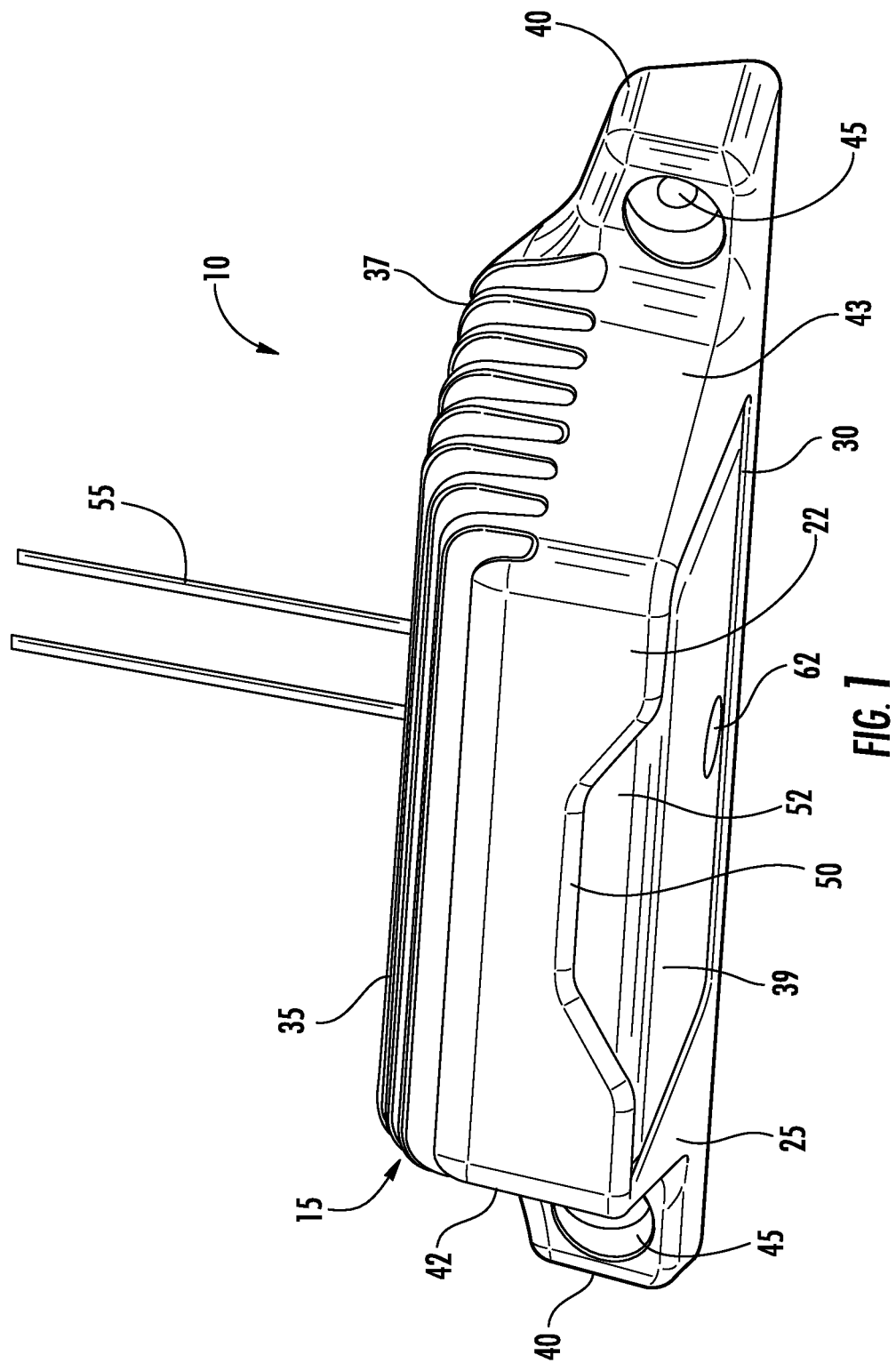
FIG. 1 is a front perspective view of the perimeter lamp assembly.
Figure 2:
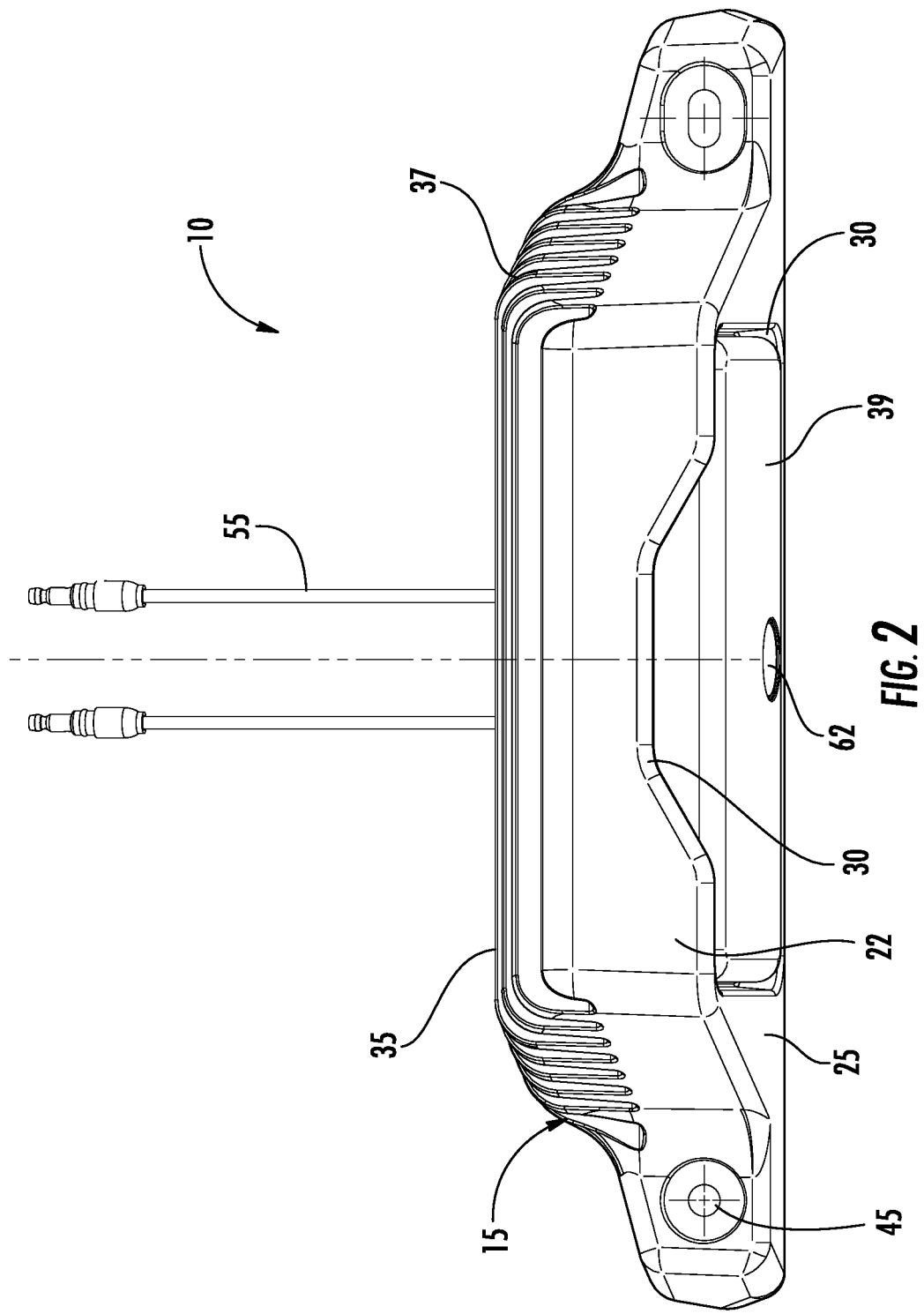
FIG. 2 is a front view of the perimeter lamp assembly of FIG. 1.
Figure 3:
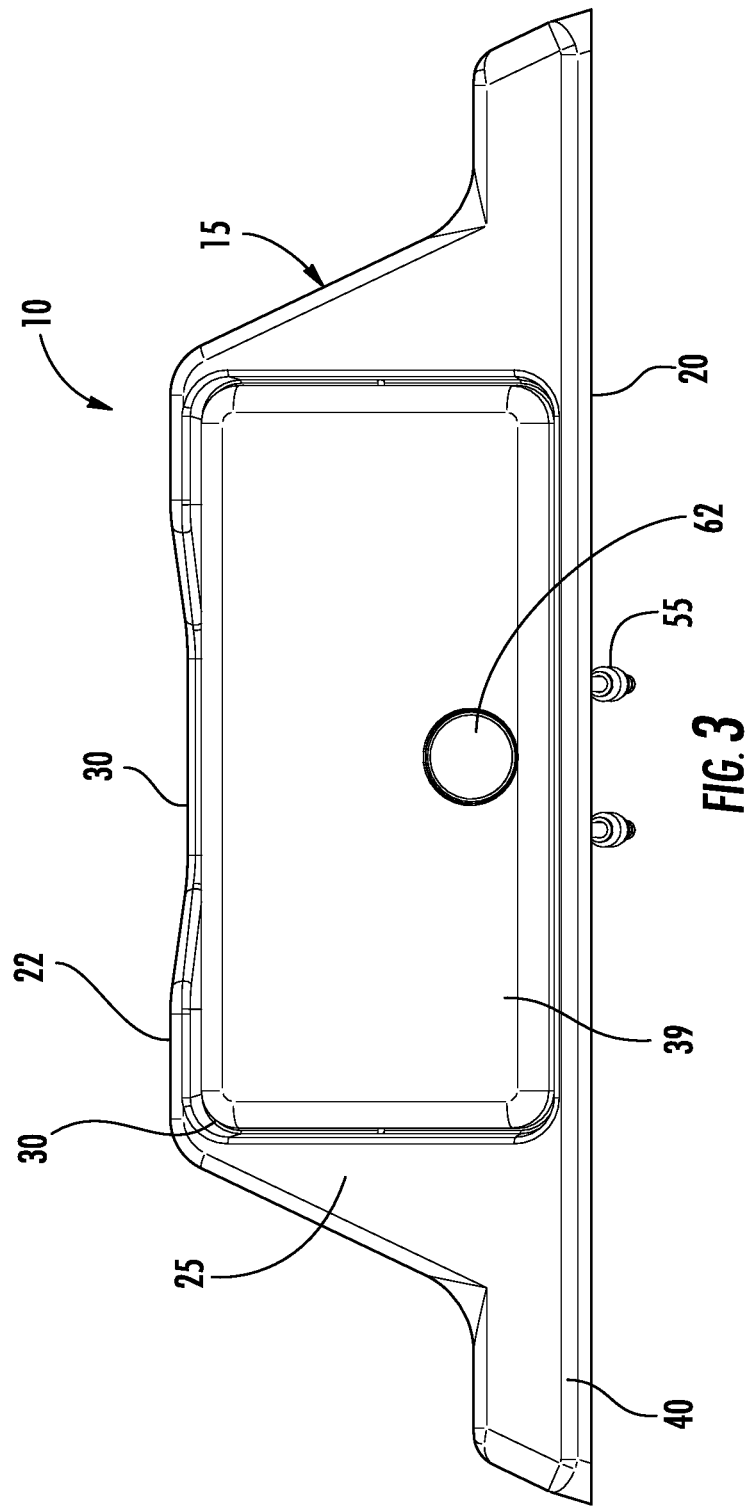
FIG. 3 is a bottom view of the perimeter lamp assembly of FIG. 1.

FIGS. 1-3 illustrate front perspective, front and bottom views of a perimeter lamp assembly 10. For purposes of this application reference to the top, bottom, front and back of perimeter lamp assembly will be made assuming the perimeter lamp assembly is in an installed position. Thus, the top of the perimeter lamp assembly will face upward and the bottom of the perimeter lamp assembly will face downward towards the ground. Similarly, the back will face towards and abut a vehicle wall and the front will face outwards away from the vehicle wall.

In general, with references to FIGS. 1-3, perimeter lamp assembly 10 includes a housing 15 having a back end 20 adapted to abut a truck wall, a front end 22, a bottom side 25 with a receiving pocket 30 formed therein and a top side 35 with a plurality of fins 37. Fins 37 facilitate the use of housing 15 as a heat sink to draw heat away from electrical components housed within perimeter lamp assembly 10. Housing may be formed of die cast aluminum. An outer lens 39 fits within receiving pocket 30 of housing 15 to allow light to pass therethrough. Mounting extensions 40 extend laterally from first and second sides 42 and 43 of perimeter lamp assembly 10. Apertures 45 are formed within mounting extensions 40 for allowing fasteners (not shown), such as screws, to secure perimeter lamp assembly to a truck wall.

In the embodiment shown receiving pocket 30 is generally rectangular in shape and includes a cutout portion 50 extending from bottom side to front end 22. Lens 39 includes a projection 52 for fitting within cutout portion 50 of housing such that ambient light may enter perimeter lamp assembly 10 through lens 39 at cutout portion 52. An ambient light sensor may be located within housing 15 near cutout portion 52 to sense conditions to trigger operation automatic operation of perimeter lamp assembly 10. In addition, as shown in FIGS. 1-3, electrical leads 55, such as power and ground wires, extend from top side 35 of perimeter lamp assembly 10.

Lens 39 also includes a vent hole 60 covered by a breathable vent patch 62. During manufacture of perimeter lamp assembly 10, pressure is applied through vent hole 60 to ensure that lens 39 is properly sealed to housing 15. Breathable vent patch 62 is applied over vent hole 60 following completion of a pressure decay test.

Figure 4:
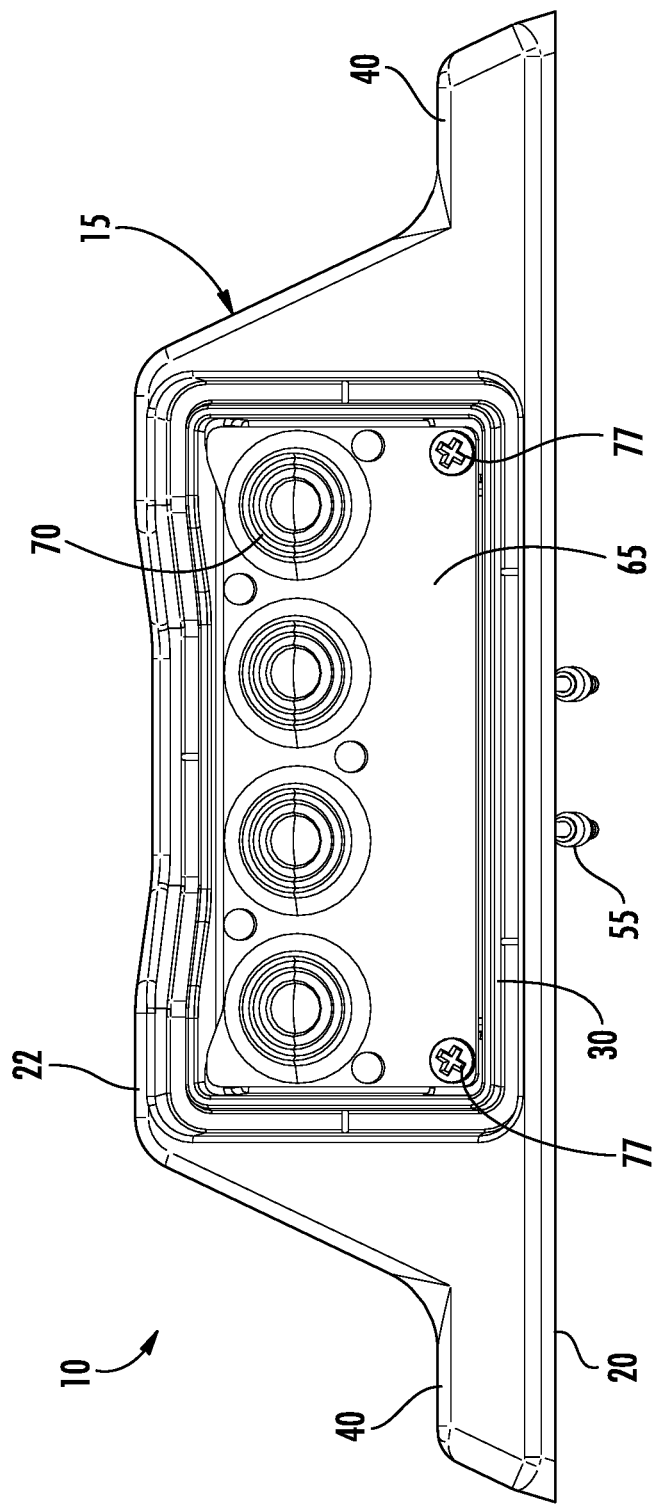
FIG. 4 is a bottom view of the perimeter lamp assembly with a lens removed.

FIG. 4 illustrates perimeter lamp assembly 10 with lens 39 removed. A culminating reflector 65 is positioned within receiving pocket 30. Culminating reflector 65 includes a plurality of light directing elements 70 and is aligned with circuit board 80 (see FIG. 5) so as to collect the light emitted from individual light emitting diodes and arrange the emitted light into parallel lines. The number of light directing elements 70 in culminating reflector 65 corresponds in a one-to-one fashion with the number of light emitting diodes disposed on the circuit board. Culminating reflector 65 may be constructed of any suitable rigid transparent material, such as various plastic polymers. For example, culminating reflector 65 may be injection molded out of polycarbonate, although other processes may also be used to manufacture the reflector. Alternatively, the culminating reflector 65 could be made out of non-plastic material (e.g., aluminum, stainless steel, etc.) If made from plastic, the molded polycarbonate culminating reflector 65 would be coated with an aluminum coating process, known in the art as vacuum metalizing. Other methods of applying a reflective coating, such as chrome plating, sputtering, in mold decoration, for example, could also be used. Culminating reflector 65 is secured to housing 15 using fasteners such as screws 77.

Figure 5:
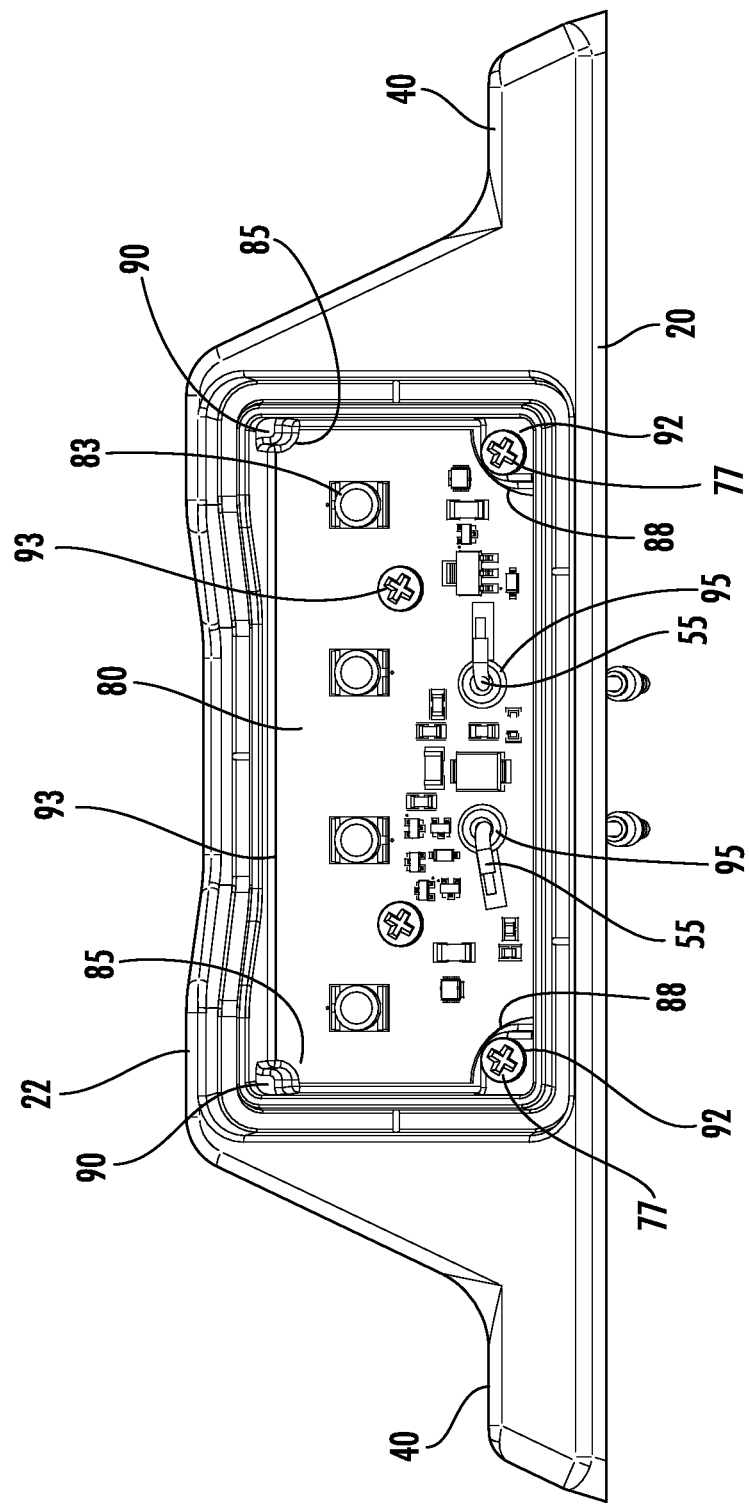
FIG. 5 is a bottom view of the perimeter lamp assembly with a collimator and lens removed.

FIG. 5 illustrates perimeter lamp assembly 10 with a circuit board 80 exposed. Thus, perimeter lamp assembly 10 is shown with lens 39 and culminating reflector 65 removed. Circuit board 80 includes a plurality of light emitting diodes 83 mounted thereon. In general, circuit board 80 is rectangular in shape and includes notches 85 cut into its front corners and notches 88 cut into its back corners for fitting around front and back protrusions 90 and 92, respectively, molded within the corners of housing receiving pocket 30. Wires 55 and wire seals 95 are also connected to circuit board 80. In the embodiment shown, circuit board 80 is secured to housing 15 with screws 93 that extends through apertures in circuit board 80 and corresponding apertures in housing 15.

Figure 6:
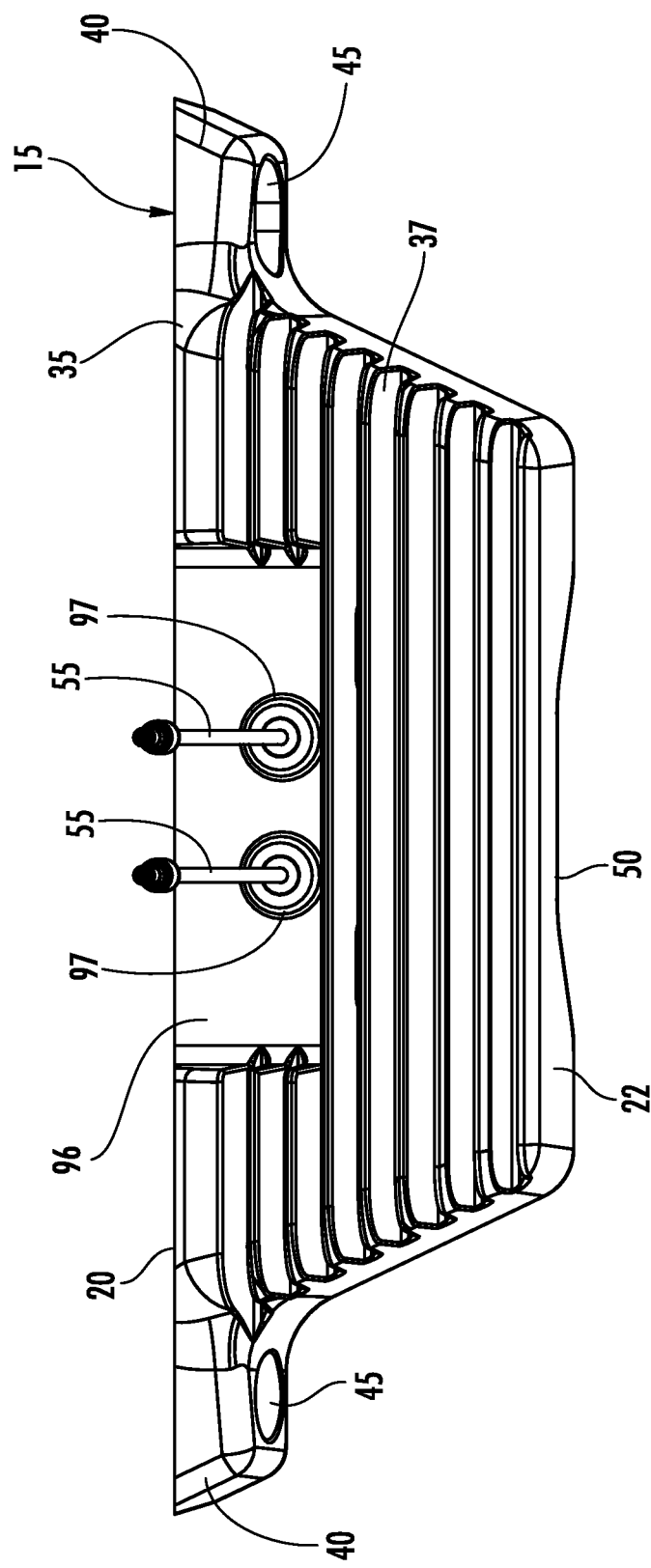
FIGS. 6 and 7 illustrate top and back perspective views of perimeter lamp assembly 10, respectively.
Figure 7:
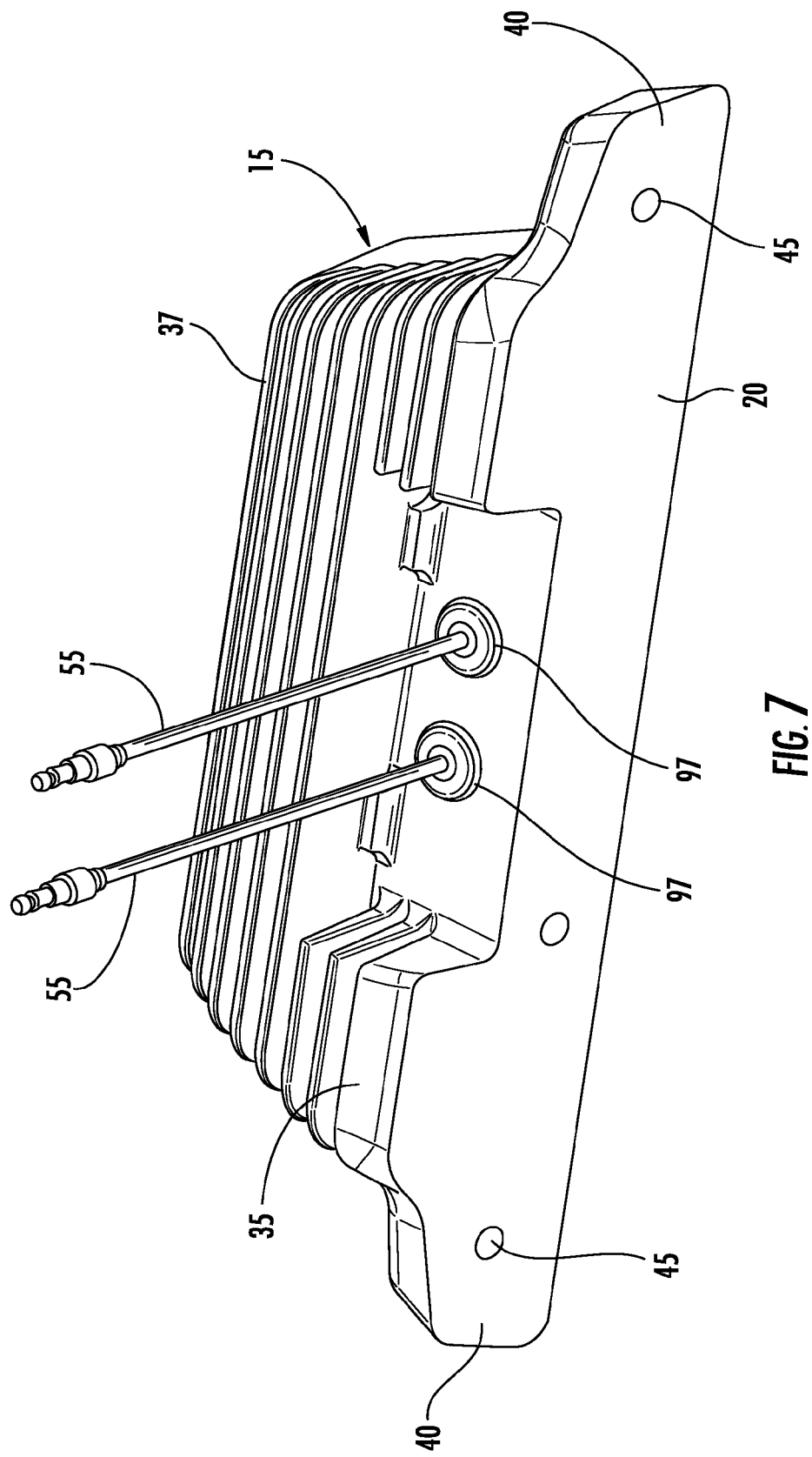

FIGS. 6 and 7 illustrate top and back perspective views of perimeter lamp assembly 10, respectively. Top side 35 includes fins 37 and a cut away area 96 formed therein. Cut away area 96 allows for wires 55 to protrude through top side 35 of housing 15 allowing for an electrical connection. Outer wire seals 97 are formed of molded rubber. Each of wires 55 pass through an outer wire seal 97. The outer wire seals 97 are then pressed into housing 15 during manufacture. When assembled, outer wire seals 97 function to prevent environmental intrusion into the lamp where wires 55 exit housing 15. As noted above, perimeter lamp assembly 10 is mounted to a truck body wall or rail along back end 20 by way of apertures 45 and fasteners (not shown).

Figure 8:
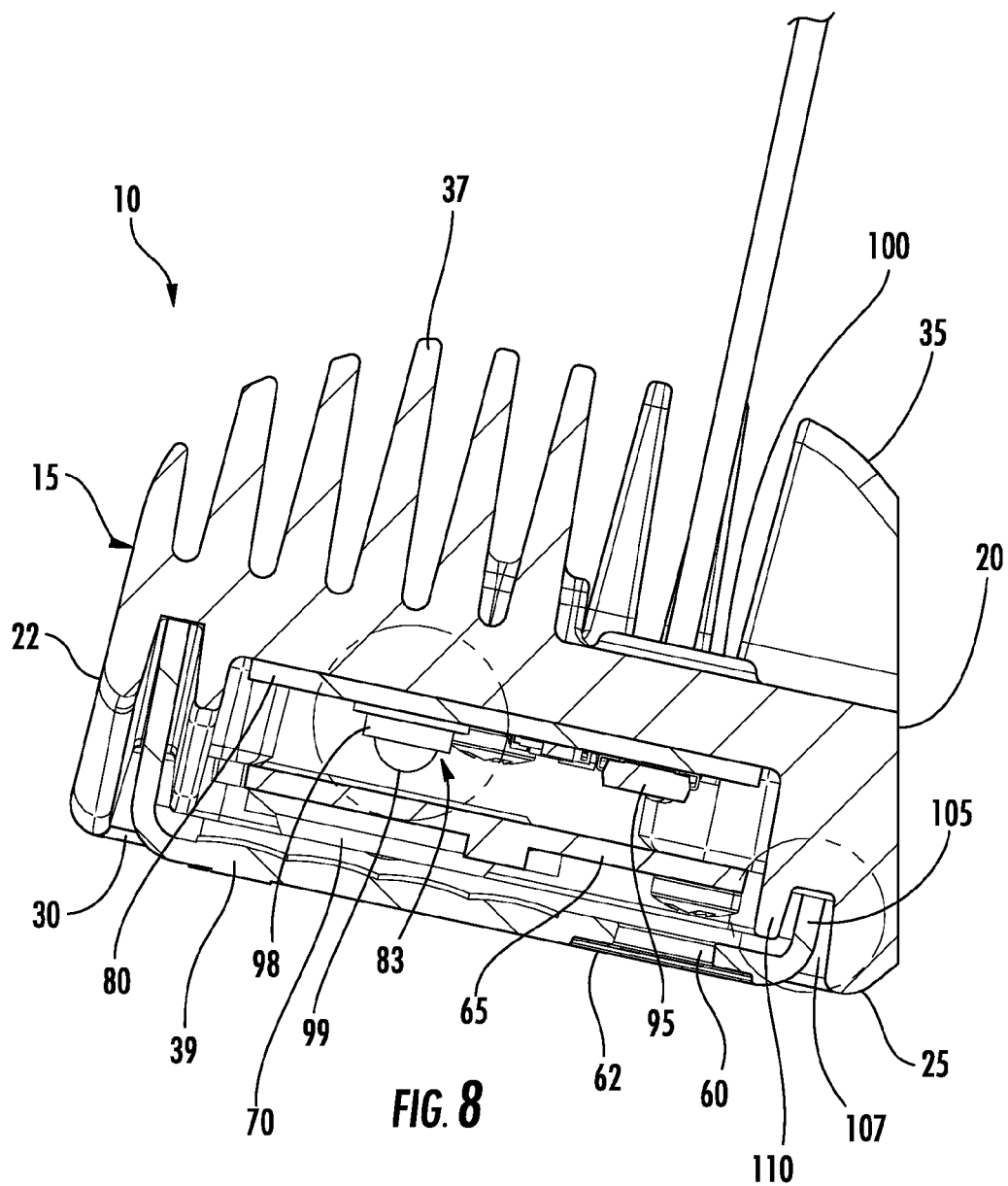
FIG. 8 is a cross-sectional view of the perimeter lamp assembly 10.

FIG. 8 is a cross-sectional view of the perimeter lamp assembly 10. As discussed above, housing 15 includes a back end 20 adapted to abut a truck wall, a front end 22, a bottom side 25 with a receiving pocket 30 formed therein and a top side 35 with a plurality of fins 37 for providing a heat sinking function. Circuit board 80 is positioned within receiving pocket 30 and includes a plurality of light emitting diodes, one of which is indicated at 83, mounted thereon. The leads of light emitting diode 83 are covered with urethane 98 that extends up to, but does not cover, the dome or light emitting portion 99 of the light emitting diode 83. In the embodiment shown, high powered light emitting diodes are employed. In addition, wire seal 95 is shown on circuit board 80 and outer wire seal 97 is shown extending from top side 35 of housing 15. Culminating reflector 65 is shown spaced apart from circuit board 80 with light directing element 70 aligned with light emitting diode 83 so as to collect the light emitted from light emitting diode 83 and arrange the emitted light into parallel lines.

Outer lens 39 is positioned over receiving pocket 30 to cover receiving pocket 30 and seal housing 15. Outer lens 39 includes an edge flange 105 that extends into a groove 107 formed in bottom end 25 of housing 15 adjacent to back wall 20. Edge flange 105 is secured within groove 107 with an adhesive (not shown). However, the adhesive does not fill groove 107 beyond the height of an inner wall 110 of groove 107 so the adhesive does not contact culminating reflector 65. Vent hole 60 and breathable cover 62 are also shown on outer lens 39 adjacent to back end 20 of housing 15. Outer lens 39 may be constructed of any suitable rigid transparent material, such as various plastic polymers including polycarbonate or acrylic plastic. An inner surface of outer lens 39 may include optical elements such as pillow optics 115, as illustrated in FIG. 8.

Figure 9:
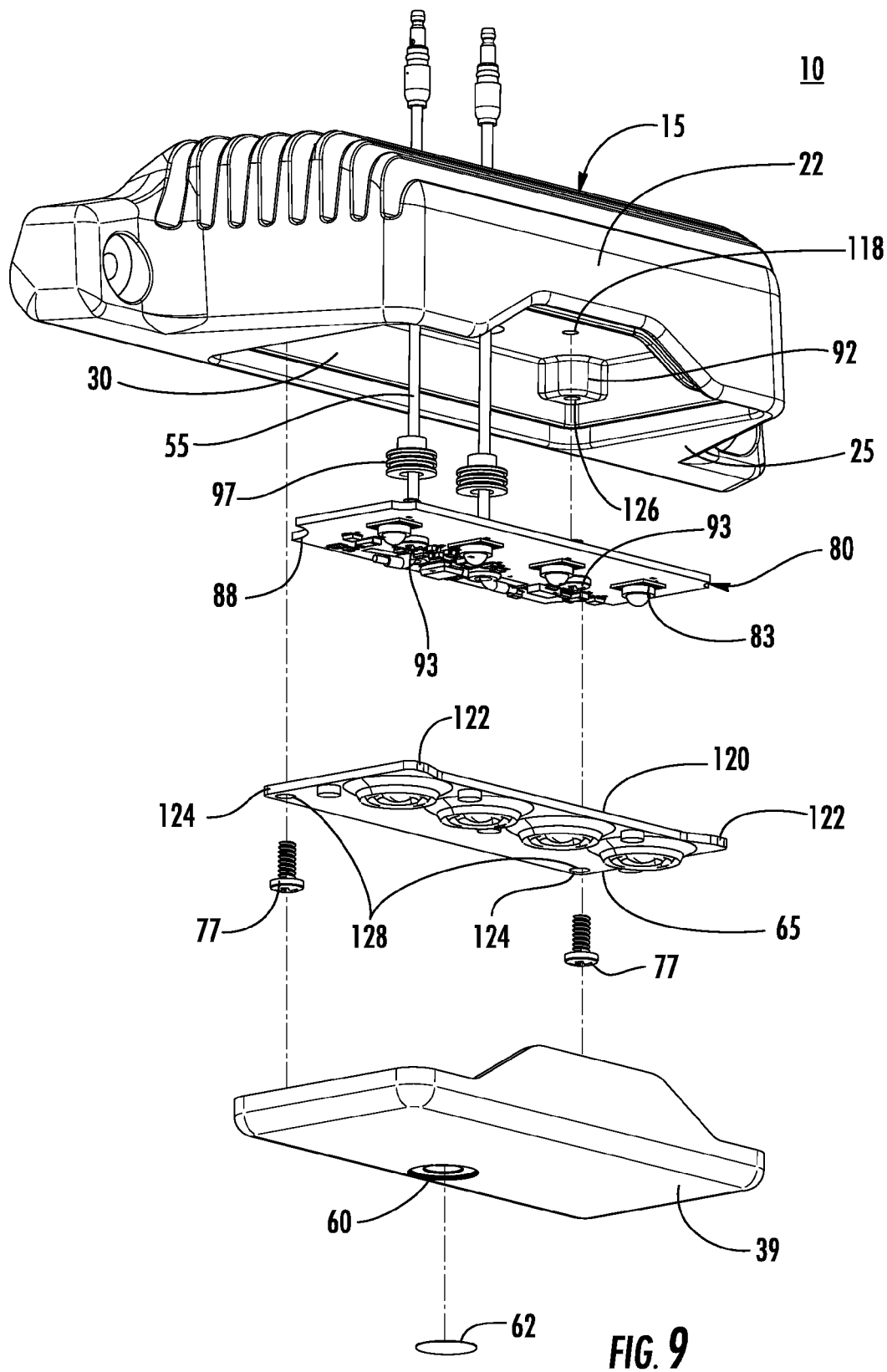
FIG. 9 is an exploded perspective view of perimeter lamp assembly 10.

FIG. 9 is an exploded perspective view of perimeter lamp assembly 10. Housing 15 is illustrated with wires 55 extending through top end 22 of housing 15. As discussed with reference to FIGS. 6 and 7, wires extend through outer wire seals 97, which are then pressed into openings in top end 22 of housing 15 to create a water tight seal. Wires 55 are also electrically connected to circuit board 80. Circuit board 80 is positioned within receiving pocket 30 of housing 15 and fastened to housing 15 with screws 93 that extend through apertures 118. Culminating reflector 65 is then positioned in receiving pocket 30 such that light directing elements 70 are aligned over light emitting diodes 83. In the embodiment shown, culminating reflector 65 includes an indented front edge 120 so that the culminating reflector does not obstruct light from entering cutout portion 50 of housing when assembled. A light sensor may be provided such that when ambient light enters perimeter lamp assembly 10 through lens 39 at cutout portion 52 automatic operation of perimeter lamp assembly 10 is activated. Corner extensions 122 are also provided on each end of the indented front edge 120 for abutting front protrusions 90 (see FIG. 5) that extend from a base of receiving pocket 30 adjacent to front end 22. In addition, back corners 124 of culminating reflector 65 abut back protrusions 92 that extend from a base of receiving pocket 30 adjacent to back side 20. Front and back protrusions 90 and 92 function to maintain a space between circuit board 80 and culminating reflector 65. Fasteners 77 are provided to secure culminating reflector 65 by way of openings 126 in back protrusions 92 and apertures 128 in culminating reflector 65, respectively, molded within the corners of housing receiving pocket 30. Outer lens 39 is positioned over receiving pocket 30 of housing 15 and secured to housing 15 with adhesive. Vent hole 60 is provided and covered by a breathable vent patch 62. Perimeter lamp assembly may then be installed on a truck or container wall.

Figure 10:
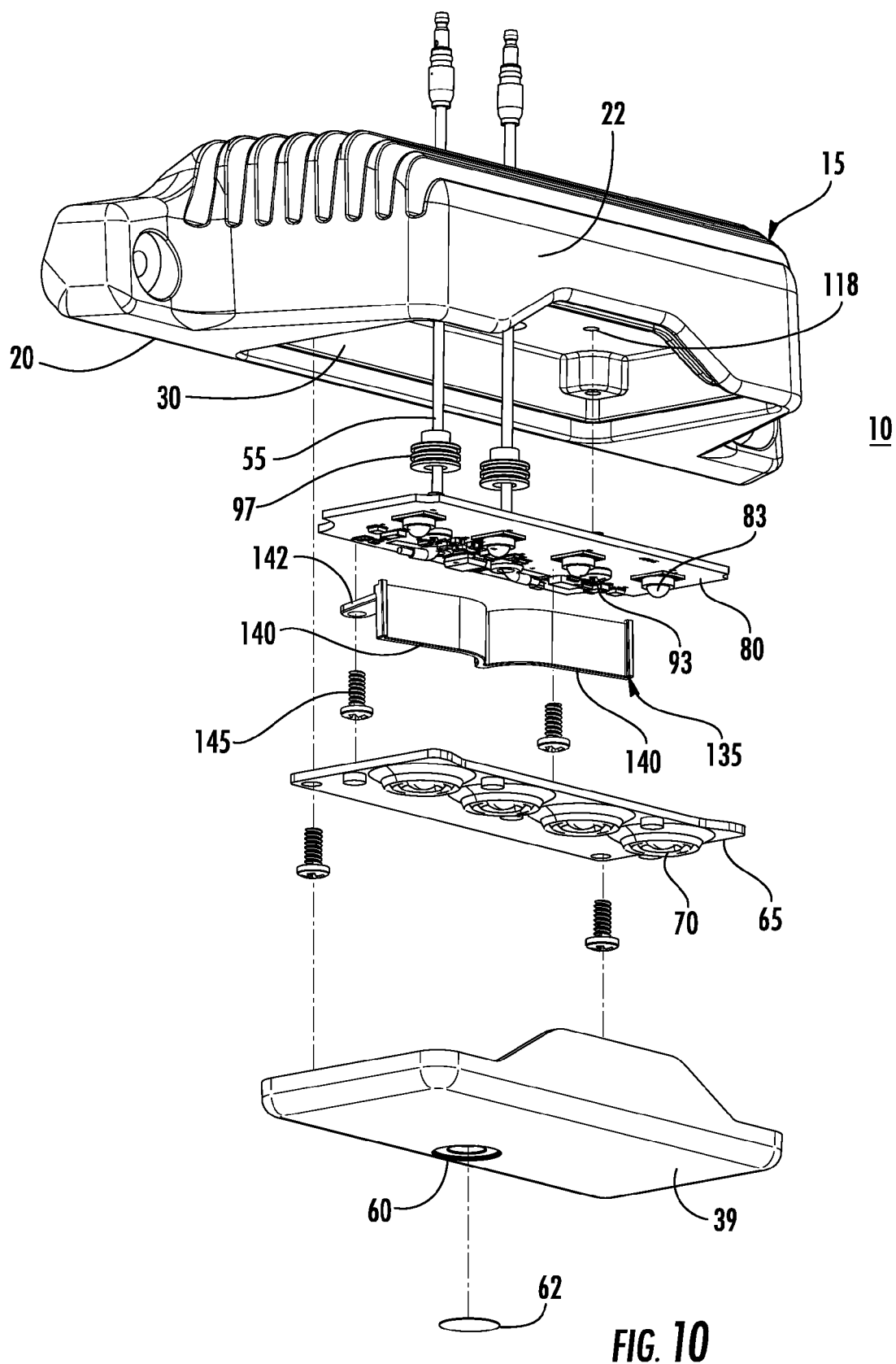
FIG. 10 is an alternate embodiment of perimeter lamp assembly 10.

FIG. 10 is an alternate embodiment of perimeter lamp assembly 10. As described with respect to FIG. 9, the lamp assembly 10 shown in FIG. 10 includes a housing 15, wires 55 extending through outer wire seals 97, and a circuit board 80. Circuit board 80 is positioned within receiving pocket 30 of housing 15 and fastened to housing 15 with screws 93 that extend through apertures 118. A light blinder 135 is then secured to circuit board 80 within housing 15. However, one of ordinary skill in the art will readily appreciate that light blocker 135 can be secured directly to circuit board 80 by any suitable means. The light blocker 135 may be constructed of metalized polycarbonate. In alternative embodiments, light blocker 135 could be constructed of any naturally reflective material, or could be coated with other reflective materials, such as white or silver paint, to achieve the same reflective properties. One of ordinary skill in the art will readily appreciate that light blocker 135 can function to block or redirect light from light emitting diodes 83. Light blocker 135 is composed of two curved sides 140, each curved side 140 corresponding to a pair of light emitting diodes. Light blocker 135 includes tabs 142 for is attaching light blocker 135 to circuit board 80 with fasteners 145. When installed, light blocker is positioned behind light emitting diodes 83 to block light from being emitted towards back end 20 of housing 15. Thus, light blocker 135 ensures that emitted light is directed towards light directing members 70 of culminating reflector 65. However, one of ordinary skill in the art will readily appreciate that the reflective surfaces could assume many geometrical shapes and still function to redirect light emitted from the LEDs. Additionally, one of ordinary skill in the art will further appreciate that different numbers of reflective surfaces could be used to redirect light emitted from the LEDs.

Following installation of light blocker 135 culminating reflector 65 is positioned in receiving pocket 30 such that light directing elements 70 are aligned over light emitting diodes 83. Outer lens 39 is positioned over receiving pocket 30 of housing 15 and secured to housing 15 with adhesive. Perimeter lamp assembly may then be installed on a truck or container wall.

As illustrated in FIG. 11-14, perimeter lamp assembly 10 may be installed in a top rail 150 of a truck trailer 155 or container body. The top rail 150 is typically positioned between the trailer roof and the trailer side wall. A typical truck body includes two top rails 150, one on the left side and one on the right side of the truck. Top rail 150 for a truck body includes a "C"-shaped cavity channel 160, a top lip 162, channel wall 165, channel bottom 168, and a bottom wall 170. Bottom wall 170 of the top rail is typically affixed to a side wall 172 of the truck body 155. Top rails 150 are typically formed as a single piece of metal. For example, a typical top rail 150 may comprise a single piece of extruded aluminum. However, other metals could be used, for example stainless steel. Also, the top rail need not be formed from a single piece of extruded metal as top rails may optionally be formed by welding multiple pieces of metal together. Moreover, materials other than metal could be used for the top rail. For example, fiberglass or other similar materials may be used. However, it should be understood that the top rails and truck bodies shown in FIGS. 11-14 are for exemplary purposes only and the use of the perimeter lamp is not limited to use with such rails and trucks.

Figure 11:
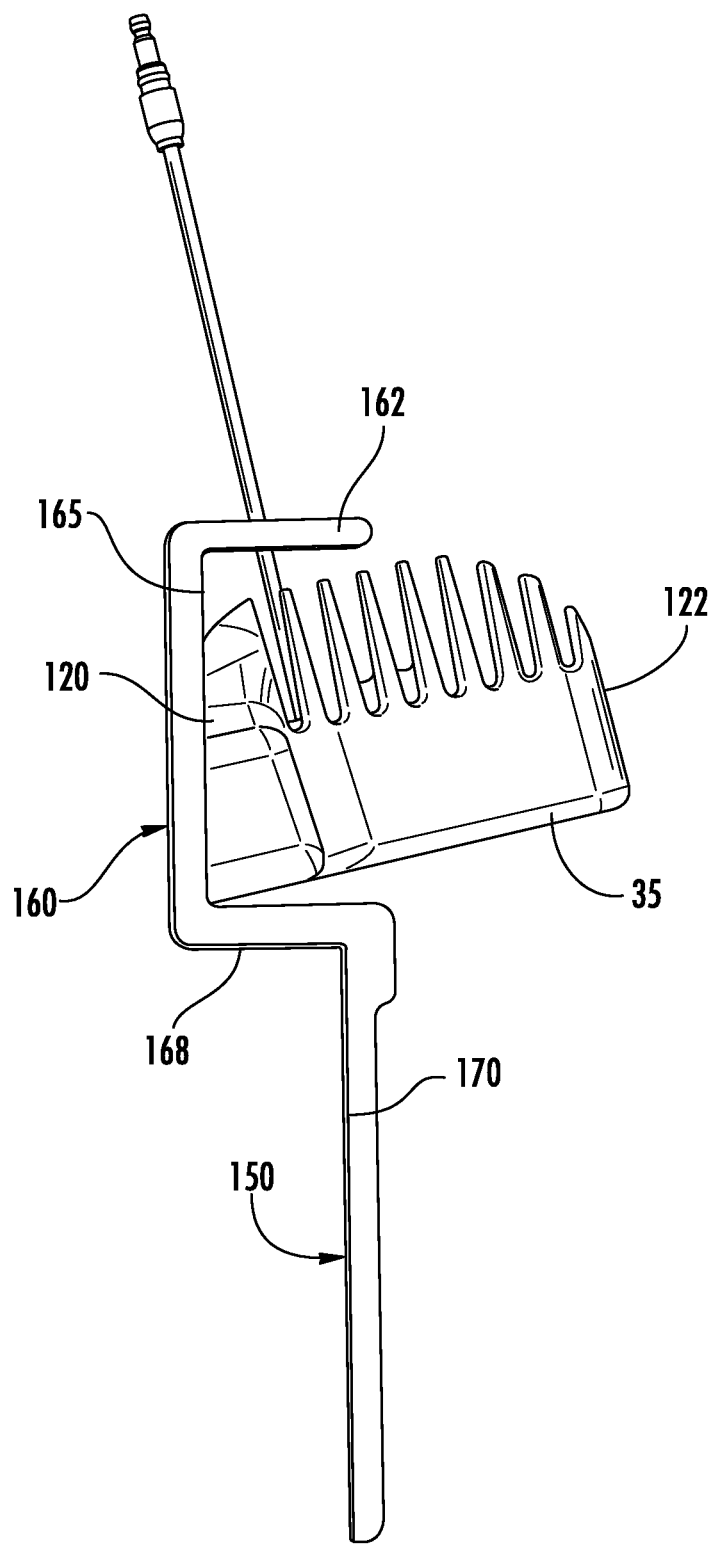
FIG. 11-14 illustrate perimeter lamp assembly 10 installed in a top rail of a truck trailer or container body.
Figure 12:
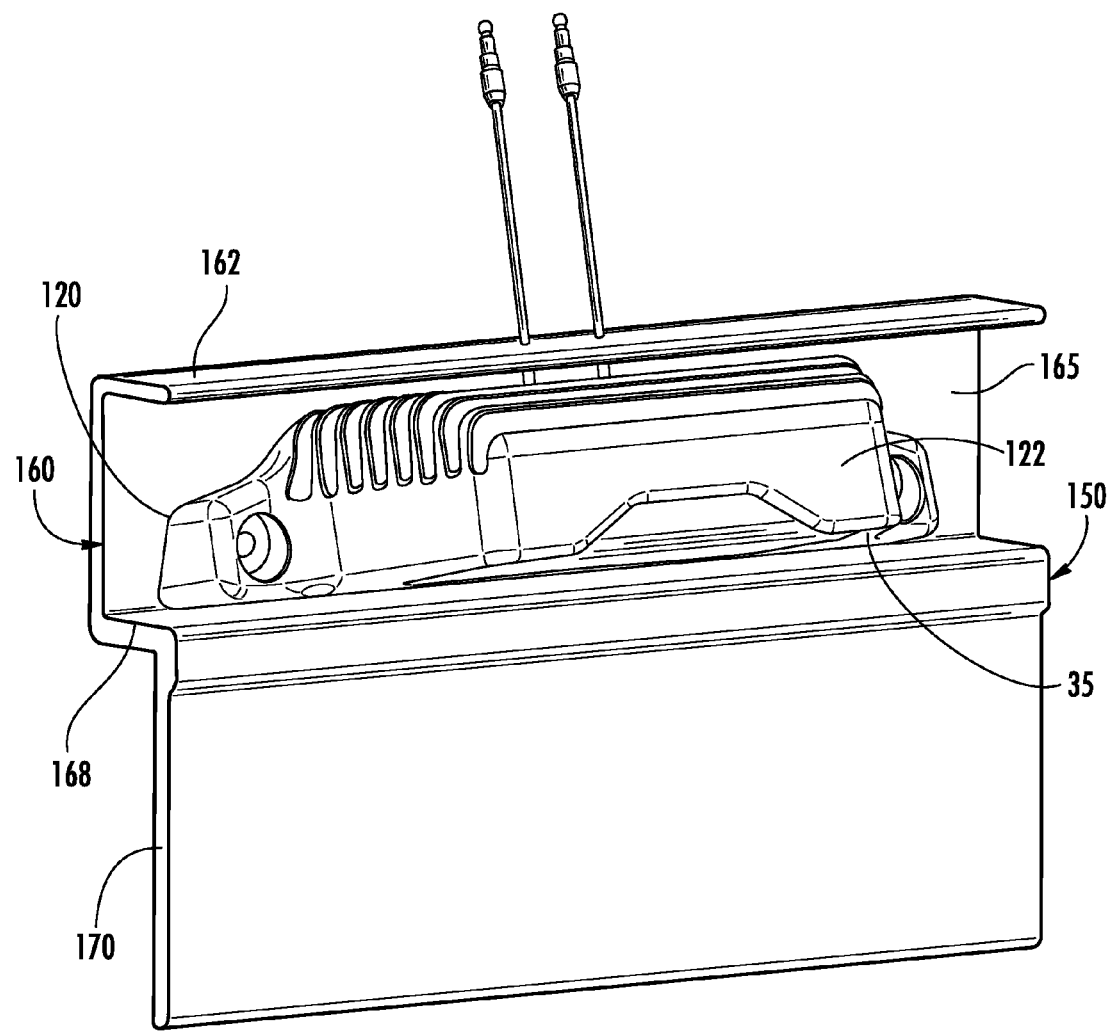
Figure 13:
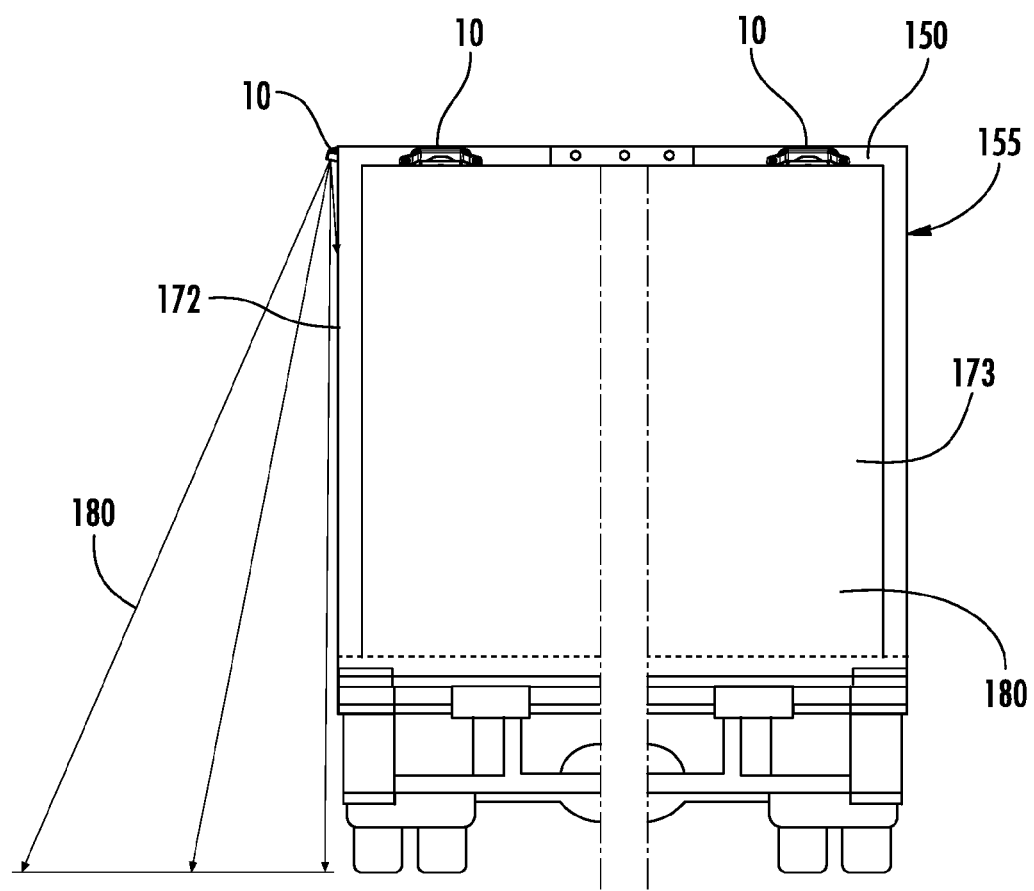
Figure 14:
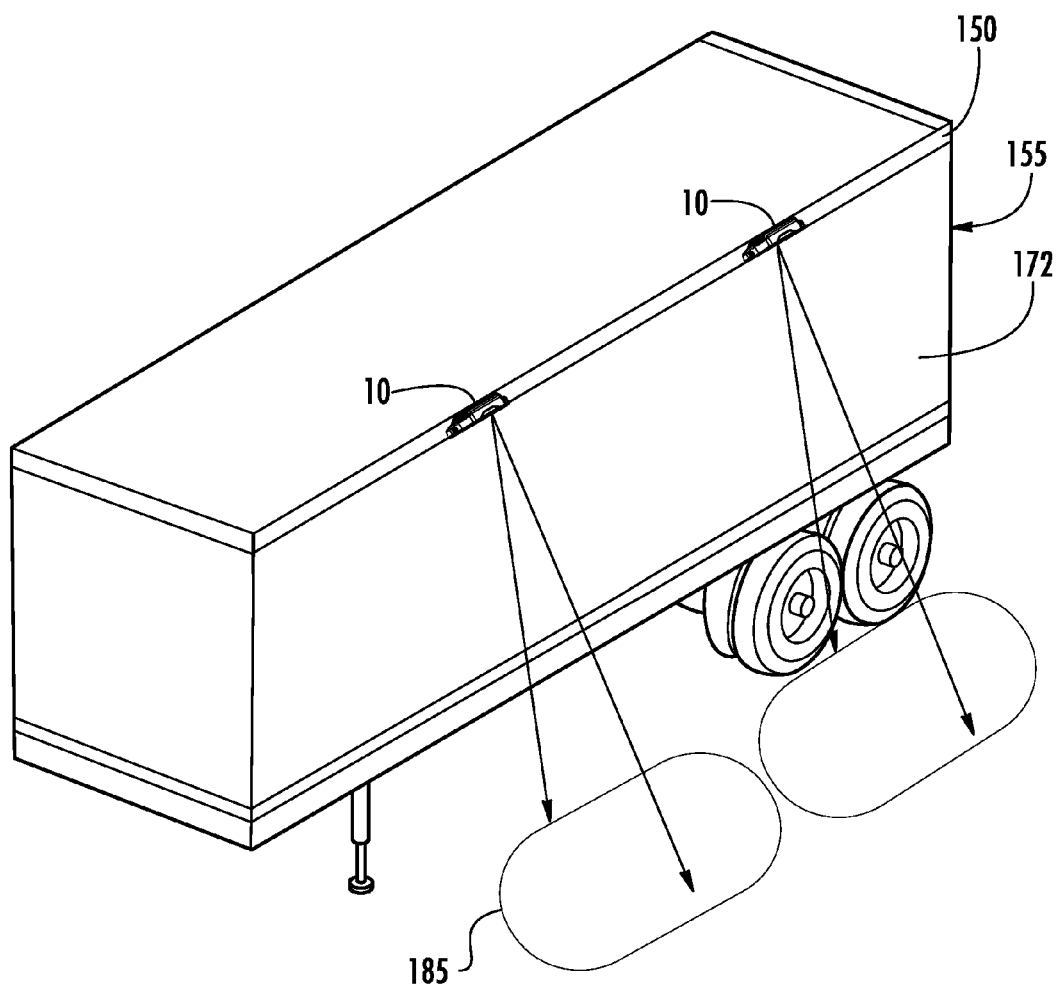

As shown in FIGS. 11 and 12, perimeter lamp assembly 10 may be affixed within top rail 150 with back side 120 of lamp assembly 10 abutting channel wall 165. Thus, light is emitted from bottom end 35 of lamp assembly 10 through lens 39. When back side 120 is flush against channel wall 165, bottom end 35 of lamp assembly 10 is at an acute angle to channel bottom 168 (which is parallel to the ground). In the embodiment shown bottom end 35 is at 10-15 degree angle to the ground and/or channel bottom 168. Thus, the light emitted by light emitting diodes 83 is projected onto a ground surface adjacent to truck wall, as shown in FIGS. 13 and 14.

In one embodiment, a plurality of perimeter lamp assemblies 10 may be spaced along the length of top rail 150 at a side 172 or back 173 of truck 155. Each lamp assembly 10 exhibits a low profile with reference to how far it extends laterally outward from truck body sidewall 172. FIG. 13 illustrates a back of a truck body 155 with one lamp assembly 10 over each door 180 for illuminating the area. At least one lamp assembly is also illustrated on a side wall of truck 155. The projected light is indicated by arrows 181. As show, the light projects along side wall and extends outward to an area adjacent to truck wall 172. FIG. 14 illustrates a truck 155 with two lamp assemblies 10 installed in upper rail 150. The projected illumination area for each lamp is indicated at 185. In one embodiment the illumination area extends about 5 feet outward from truck side wall 172.

Figure 15:
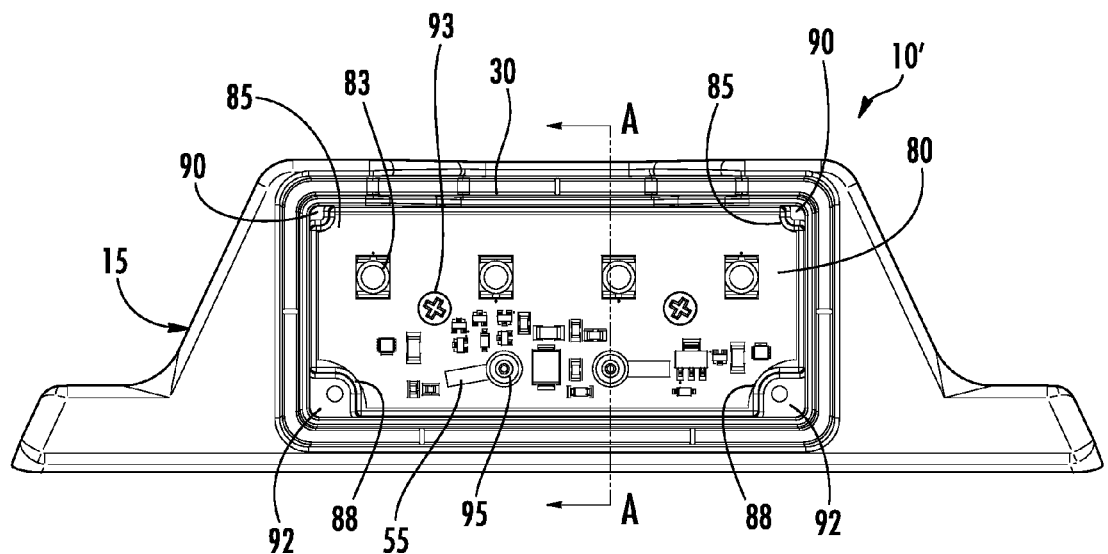
FIGS. 15-17 illustrate alternate embodiments of perimeter lamp assembly.
Figure 16:
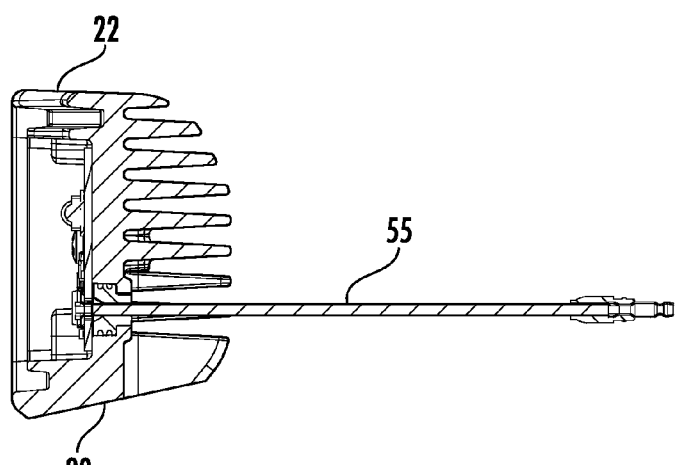
Figure 17:
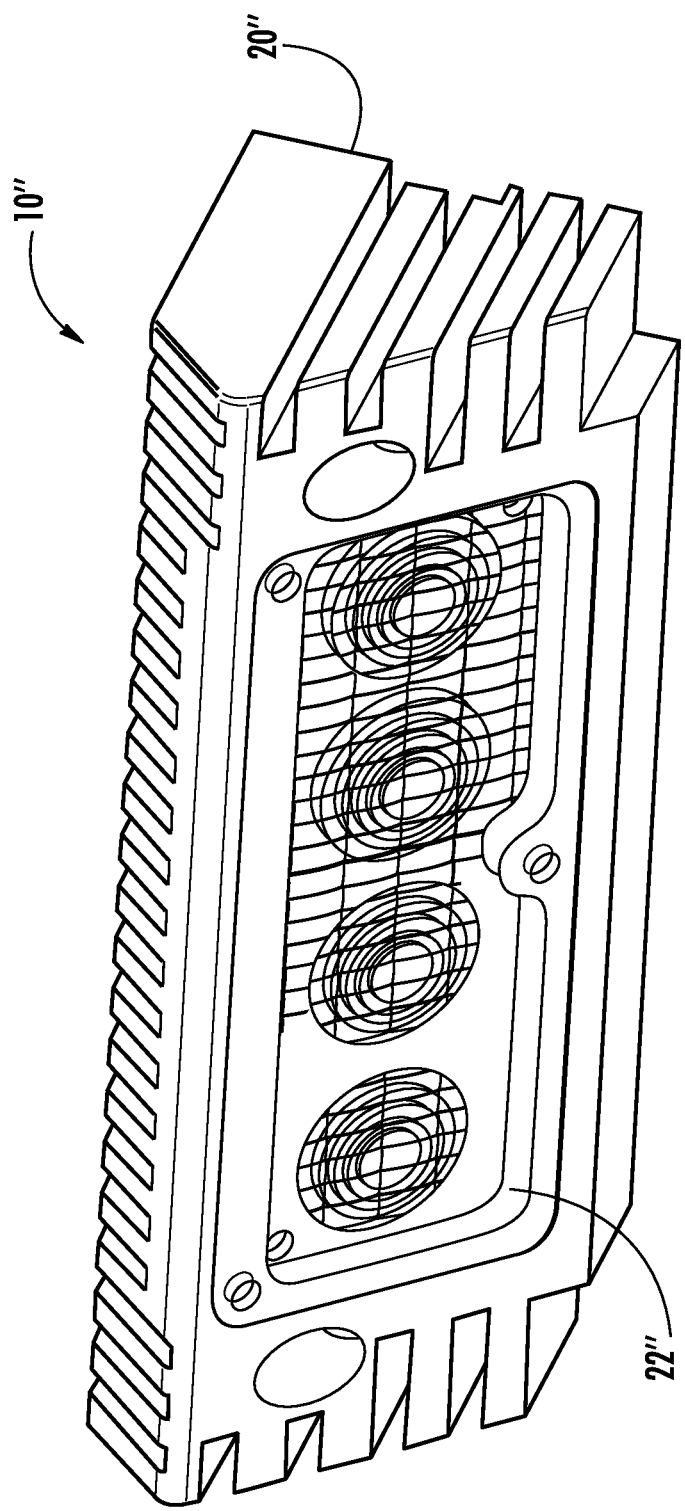

FIGS. 15-17 illustrate alternate embodiments of perimeter lamp assembly 10. In particular, FIG. 15 illustrates a lamp assembly 10' without a cut out window or a culminating reflector and FIG. 16 is a cross-sectional view of the lamp of FIG. 15. FIG. 15 illustrates perimeter lamp assembly 10' with a circuit board 80 exposed. Thus, perimeter lamp assembly 10 is shown with lens 39 removed. Circuit board 80 includes a plurality of light emitting diodes 83 mounted thereon. In general, circuit board 80 is rectangular in shape and includes notches 85 cut into its front corners and notches 88 cut into its back corners for fitting around front and back protrusions 90 and 92, respectively, molded within the corners of housing receiving pocket 30. Wires 55 and wire seals 95 are also connected to circuit board 80. In the embodiment shown, circuit board 80 is secured to housing 15 with screws 93 that extends through apertures in circuit board 80 and corresponding apertures in housing 15. Lamp assembly 10' may be installed in a truck top rail or on a truck body wall similar to lamp assembly 10. FIG. 17 illustrates an alternative embodiment of lamp assembly 10" with a back wall 20" that is mounted to a truck wall or rail and a light emitting wall 22" that is angled downward towards the ground.

Although the embodiments of the invention herein have been described with reference to particular embodiments, it is to be understood that these embodiments are merely illustrative of the principles and applications of the present invention. For example, perimeter lamp assembly 10 may include different colored LEDs or lenses to change the color of the projected light. The housing may include a hole and slot on opposite ends so that it can be fixed to a surface, rather than two holes or apertures. It is therefore to be understood that numerous modifications may be made to the illustrative embodiments and that other arrangements may be devised without departing from the spirit and scope of the present invention as defined by the appended claims.

The invention claimed is:

1. A perimeter lamp assembly for a truck comprising:
   a housing having a back end adapted to abut a truck wall, a front end, a bottom side with a receiving pocket formed therein and a top side with a plurality of fins formed therein;
   a circuit board adapted to fit within the receiving pocket of the housing;
   a plurality of light emitting diodes mounted on the circuit board;
   a collimator having a plurality of light directing elements, said collimator being mounted above the circuit board such that light emitted from said plurality of light emitting diodes passes through said plurality of light directing elements;
   a lens mounted over the receiving pocket of the bottom side of the housing; and
   wherein the bottom side of the housing is at an acute angle to a ground surface while the back end is adjacent and parallel to the truck wall such that light emitted by the plurality of light emitting diodes is projected onto the ground surface adjacent to the truck wall.

2. The perimeter lamp assembly of claim 1 wherein the perimeter lamp is mounted at a top end of a truck wall.

3. The perimeter lamp assembly of claim 1 where in the perimeter lamp is mounted in a top rail of a truck body.

4. The perimeter lamp assembly of claim 1 further comprising a light blinder positioned between the plurality of light emitting diodes and the back end of the housing.

5. The perimeter lamp assembly of claim 1 wherein the front end of the housing includes a cutout portion and the lens includes a projection for fitting within the cutout such that light may project through the lens at the cutout portion of the front end.

6. The perimeter lamp assembly of claim 1 wherein the lens further includes an vent hole covered by a breathable vent patch.

7. The perimeter lamp assembly of claim 1 where in the angle between the bottom side of the housing through which light is projected and the ground is between 10 and 15 degrees.

8. The perimeter lamp assembly of claim 1 wherein the light emitted by the plurality of light emitting diodes onto the ground surface extends outward 5-6 feet from the truck wall.

9. The perimeter lamp assembly of claim 1 wherein the lens includes pillow optics.

10. The perimeter lamp assembly of claim 1 wherein said lens includes an edge flange that extends into a groove formed in the bottom end of housing such that said lens covers and seals the receiving pocket.

11. A perimeter lamp assembly for use in a truck having a trailer body with opposing side walls, each of the side walls having a top end and a bottom end, said perimeter lamp assembly comprising:

a housing having a back end adapted to be affixed to one of said opposing side walls of the truck, a front end, a bottom side extending at an upward angle from said back end and a top side parallel to said bottom side and extending at an upward angle from said back end, said top side having a plurality of fins extending therefrom;

a circuit board adapted to fit within the bottom side of the housing;

a plurality of light emitting diodes mounted on the circuit board;

a collimator having a plurality of light directing elements, said collimator being mounted above the circuit board such that light emitted from said plurality of light emitting diodes passes through said plurality of light directing elements;

a lens mounted over the bottom side of the housing; and wherein the bottom side of the housing is at an acute angle to a ground surface when the back end of the housing is affixed to and parallel to said opposing side wall such that light emitted by the plurality of light emitting diodes is projected onto the ground surface adjacent to the truck wall.

12. The perimeter lamp assembly of claim 11 further comprising a light blinder positioned between the plurality of light emitting diodes and the back end of the housing.

13. The perimeter lamp assembly of claim 11 wherein the front end of the housing includes a cutout portion and the lens includes a projection for fitting within the cutout such that light may project through the lens at the cutout portion of the front end.

14. The perimeter lamp assembly of claim 11 wherein the lens further includes an vent hole covered by a breathable vent patch.

15. The perimeter lamp assembly of claim 11 where in the angle between the bottom side of the housing through which light is projected and the ground is between 10 and 15 degrees when said back end of the housing is affixed to and parallel to said opposing side wall.

16. The perimeter lamp assembly of claim 11 wherein the lens includes pillow optics.

17. The perimeter lamp assembly of claim 11 wherein said lens includes an edge flange that extends into a groove formed in the bottom end of housing such that said lens covers and seals the bottom end of the housing.

18. A perimeter lamp assembly for use in a truck having a trailer body with opposing side walls, said perimeter lamp assembly comprising:

a housing having a back end adapted to be affixed to one of said opposing side walls of the truck, a front end, a bottom side with a receiving pocket formed therein, said bottom side extending at an upward angle from said back end, and a top side parallel to said bottom side and extending at an upward angle from said back end, said top side having a plurality of fins extending therefrom;

a circuit board adapted to fit within the receiving pocket of the housing;

a plurality of light emitting diodes mounted on the circuit board;

a collimator having a plurality of light directing elements, said collimator being mounted above the circuit board such that light emitted from said plurality of light emitting diodes passes through said plurality of light directing elements;

a lens mounted over the receiving pocket of the bottom side of the housing; and wherein the bottom side of the housing is at an acute angle to a ground surface when the back end of the housing is affixed to and parallel to said opposing side wall such that light emitted by the plurality of light emitting diodes is projected onto the ground surface adjacent to the truck wall.

19. The perimeter lamp assembly of claim 18 wherein said lens includes an edge flange that extends into a groove formed in the bottom end of housing such that said lens covers and seals the receiving pocket.

20. The perimeter lamp assembly of claim 18 wherein the front end of the housing includes a cutout portion and the lens includes a projection for fitting within the cutout such that light may project through the lens at the cutout portion of the front end.

* * * * *